(12) United States Patent
Ishitsuka

(10) Patent No.: US 12,269,587 B2
(45) Date of Patent: Apr. 8, 2025

(54) ROTOR SUPPORT DEVICE

(71) Applicant: HONDA MOTOR CO., LTD., Tokyo (JP)

(72) Inventor: Yuji Ishitsuka, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 65 days.

(21) Appl. No.: 18/457,837

(22) Filed: Aug. 29, 2023

(65) Prior Publication Data

US 2024/0076031 A1 Mar. 7, 2024

(30) Foreign Application Priority Data

Sep. 2, 2022 (JP) .................................. 2022-139603

(51) Int. Cl.
*B64C 29/00* (2006.01)
*B64C 27/32* (2006.01)

(52) U.S. Cl.
CPC .......... *B64C 29/0025* (2013.01); *B64C 27/32* (2013.01)

(58) Field of Classification Search
CPC ........... B64C 1/00; B64C 11/02; B64C 27/08; B64C 29/0025; B64D 27/31; B64D 27/32; F16L 9/04; F16L 9/14; F16L 25/10; F16L 57/005; B64U 30/291; B64U 30/292
See application file for complete search history.

(56) References Cited

U.S. PATENT DOCUMENTS

| | | |
|---|---|---|
| 2020/0385130 A1 | 12/2020 | Verna et al. |
| 2021/0107640 A1 | 4/2021 | Baity et al. |

FOREIGN PATENT DOCUMENTS

| | | | | |
|---|---|---|---|---|
| CN | 205168884 U | 4/2016 | | |
| CN | 209553498 U | 10/2019 | | |
| EP | 4 265 518 A1 | 10/2023 | | |
| WO | WO-2017166275 A1 | * 10/2017 | ............... | B64C 1/00 |
| WO | WO-2018076470 A1 | * 5/2018 | ............... | B64C 1/06 |
| WO | WO-2019204932 A1 | * 10/2019 | ............... | B64C 1/16 |
| WO | 2022/130501 A1 | 6/2022 | | |

OTHER PUBLICATIONS

European Search Report dated Jan. 15, 2024, European Application No. 23194711.0-1004, English text, 7 pages.

* cited by examiner

*Primary Examiner* — Woody A Lee, Jr.
*Assistant Examiner* — Cameron A Corday
(74) *Attorney, Agent, or Firm* — Rankin, Hill & Clark LLP

(57) ABSTRACT

A rotor support device includes: a mount supporting a rotor and including a joint portion protruding outward; a connecting member; and a reinforcing member. The connecting member includes an end portion connected to the joint portion and including a notch and a protruding portion formed by forming the notch. The protruding portion is overlapped with a part of the outer peripheral surface of the joint portion located on the side of a first direction perpendicular to the protruding direction of the joint portion, and is detachably connected to the joint portion. The reinforcing member is overlapped with the connecting member and another part of the outer peripheral surface of the joint portion located on the side of a second direction opposite to the first direction, and is detachably connected to the joint portion and the connecting member.

9 Claims, 5 Drawing Sheets

ROTOR SUPPORT DEVICE

CROSS-REFERENCE TO RELATED APPLICATIONS

This application is based upon and claims the benefit of priority from Japanese Patent Application No. 2022-139603 filed on Sep. 2, 2022, the contents of which are incorporated herein by reference.

BACKGROUND OF THE INVENTION

Field of the Invention

The present invention relates to a rotor support device for supporting rotors that generate thrust in a vertical direction.

Description of the Related Art

US 2020/0385130 A1 discloses a vertical take-off and landing aircraft that generates thrust in a vertical direction with a plurality of rotors. Vertical take-off and landing aircraft are commonly referred to as VTOL aircraft. The VTOL aircraft of US 2020/0385130 A1 includes two rotors on each of the left and right sides of the fuselage. A first rotor of the two rotors is attached to a first support member extending forward of the front wing. A second rotor of the two rotors is attached to a second support member extending from the front wing to the rear wing.

SUMMARY OF THE INVENTION

Preferably, the rotor support structure is easy to assemble and disassemble, and easy to maintain.

An object of the present invention is to solve the above-mentioned problem.

According to an aspect of the first invention, there is provided a rotor support device that is provided in an aircraft and supports a rotor configured to generate thrust in a vertical direction, the rotor support device comprising: a mount configured to support the rotor and including a joint portion protruding outward; a connecting member extending in a protruding direction of the joint portion and detachably connected to the joint portion; and a reinforcing member detachably connected to the joint portion and the connecting member in order to reinforce connection between the joint portion and the connecting member, wherein the connecting member includes an end portion connected to the joint portion, and the end portion includes a notch and a protruding portion that is formed by forming the notch, the protruding portion is overlapped with a part of an outer peripheral surface of the joint portion, the part being located on a side of a first direction perpendicular to the protruding direction of the joint portion, and is detachably connected to the joint portion, and the reinforcing member is overlapped with the connecting member and another part of the outer peripheral surface of the joint portion, the another part being located on a side of a second direction opposite to the first direction, and is detachably connected to the joint portion and the connecting member.

According to an aspect of the second invention, there is provided a rotor support device that is provided in an aircraft and supports a rotor configured to generate thrust in a vertical direction, the rotor support device comprising: a mount configured to support the rotor and including a joint portion protruding outward; a connecting member extending in a protruding direction of the joint portion and detachably connected to the joint portion; and a reinforcing member detachably connected to the joint portion and the connecting member in order to reinforce connection between the joint portion and the connecting member, wherein the connecting member includes an end portion connected to the joint portion, and the end portion includes a notch and a protruding portion that is formed by forming the notch, the protruding portion is overlapped with the joint portion from a first direction perpendicular to the protruding direction of the joint portion, and is detachably connected to the joint portion, and the reinforcing member is overlapped with the joint portion and the connecting member from a second direction that is opposite to the first direction, and is detachably connected to the joint portion and the connecting member.

According to the present invention, the rotor support structure is easy to assemble and disassemble, and easy to maintain.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

1. Configuration of VTOL Aircraft 10

Figure 1:
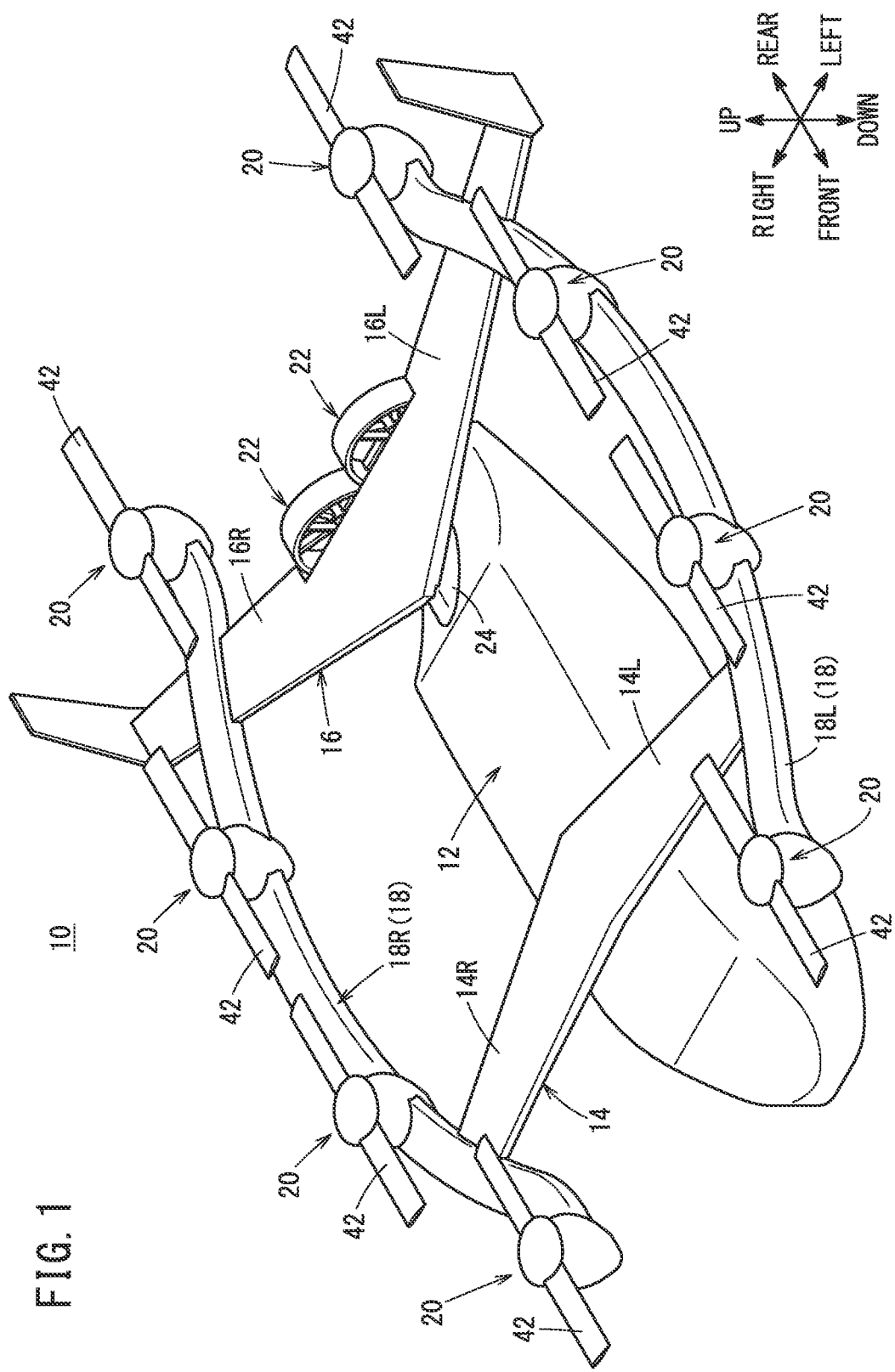
FIG. 1 is an external view of a VTOL aircraft.

FIG. 1 is an external view of a VTOL aircraft 10. The VTOL aircraft 10 is, for example, an electric vertical take-off and landing aircraft, a so-called eVTOL aircraft. The VTOL aircraft 10 includes a fuselage 12, a front wing 14, a rear wing 16, two booms 18, eight VTOL rotors 20, and two cruise rotors 22.

The front wing 14 is connected to a front portion of the fuselage 12. The front wing 14 includes a left wing 14L and a right wing 14R. The rear wing 16 is connected to a rear portion of the fuselage 12. The rear wing 16 includes a left wing 16L and a right wing 16R. The front wing 14 and the rear wing 16 generate lift as the VTOL aircraft 10 moves forward.

Each of the two booms 18 is a rotor support device that supports four VTOL rotors 20. A boom 18R of the two booms 18 is disposed on the right side of the fuselage 12. A boom 18L of the two booms 18 is disposed on the left side of the fuselage 12. Each boom 18 extends in the front-rear direction.

Four VTOL rotors 20 are arranged on the boom 18L sequentially toward the rear. Similarly, four VTOL rotors 20 are arranged on the boom 18R sequentially toward the rear. Each VTOL rotor 20 generates thrust in the vertical direction.

Two cruise rotors 22 are disposed on the rear wing 16 so as to be arranged side by side in the left-right direction. Each cruise rotor 22 generates thrust in the horizontal direction.

2. Configuration of Boom 18 (Rotor Support Device)

Figure 2:
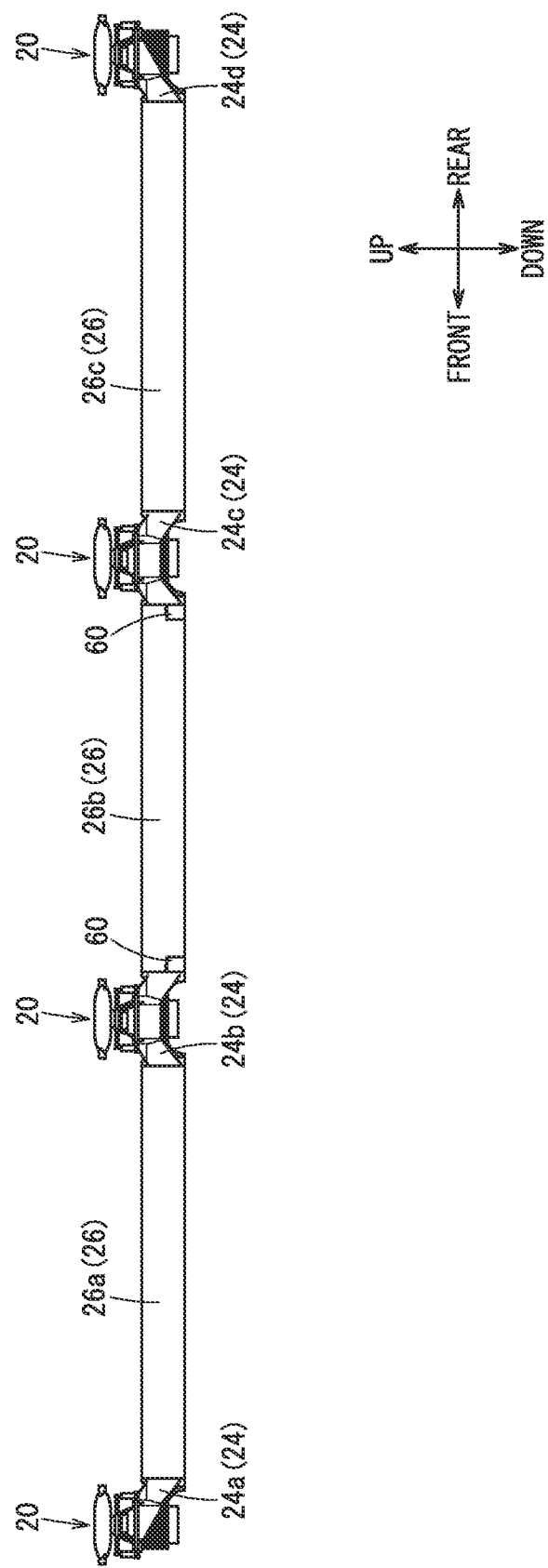
FIG. 2 is a left side view of a boom.
Figure 3:
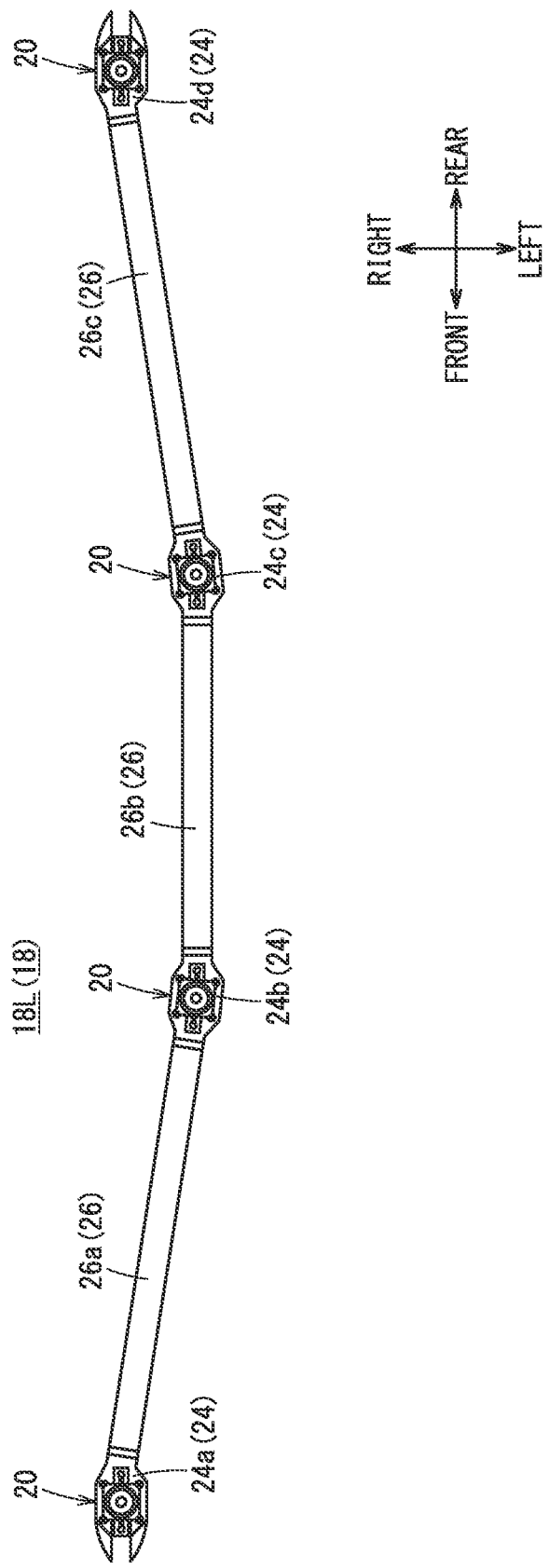
FIG. 3 is a top view of the boom.

FIG. 2 is a left side view of the boom 18L. FIG. 3 is a top view of the boom 18L. Note that FIG. 1 referred to in the above description shows the boom 18L with a fairing attached. On the other hand, FIGS. 2 and 3 show the boom 18L with the fairing removed. FIGS. 2 and 3 also show the boom 18L with four VTOL rotors 20 attached. The structure of the boom 18R is identical to that of the boom 18L except that the left and right sides are reversed. Therefore, in this specification, the boom 18L will be described, and the description of the boom 18R will be omitted.

The boom 18L includes four mounts 24 and three connecting pipes 26 (connecting members). The four mounts 24 include a front mount 24a, a first mount 24b, a second mount 24c, and a rear mount 24d. The three connecting pipes 26 include a front pipe 26a, an intermediate pipe 26b, and a rear pipe 26c. The front mount 24a, the front pipe 26a, the first mount 24b, the intermediate pipe 26b, the second mount 24c, the rear pipe 26c, and the rear mount 24d are connected in this order toward the rear.

As shown in FIG. 3, when viewed from above, the front pipe 26a extends in a direction rotated clockwise by a predetermined angle with respect to the front-rear direction. The front pipe 26a is connected to the front mount 24a and the first mount 24b. The front end portion of the front pipe 26a and the front mount 24a are permanently connected. The rear end portion of the front pipe 26a and the first mount 24b are permanently connected. Further, the left wing 14L of the front wing 14 is connected to the front pipe 26a (see FIG. 1).

The intermediate pipe 26b extends in the front-rear direction. The intermediate pipe 26b is connected to the first mount 24b and the second mount 24c. The front end portion of the intermediate pipe 26b and the first mount 24b are detachably connected to each other. The rear end portion of the intermediate pipe 26b and the second mount 24c are detachably connected to each other. The structure of connection between the mount 24 (the first mount 24b and the second mount 24c) and the intermediate pipe 26b will be described later.

As shown in FIG. 3, when viewed from above, the rear pipe 26c extends in a direction rotated counterclockwise by a predetermined angle with respect to the front-rear direction. The rear pipe 26c is connected to the second mount 24c and the rear mount 24d. The front end portion of the rear pipe 26c and the second mount 24c are permanently connected. The rear end portion of the rear pipe 26c and the rear mount 24d are permanently connected. Further, the left wing 16L of the rear wing 16 is connected to the rear pipe 26c (see FIG. 1).

As described above, the four mounts 24 and the three connecting pipes 26 are alternately connected from the front to the rear. Further, the front pipe 26a is supported by the left wing 14L of the front wing 14, and the rear pipe 26c is supported by the left wing 16L of the rear wing 16. As a result, the boom 18L is fixed in the left direction of the fuselage 12.

3. Structure of Connection Between First Mount 24b and Intermediate Pipe 26b

Figure 4:
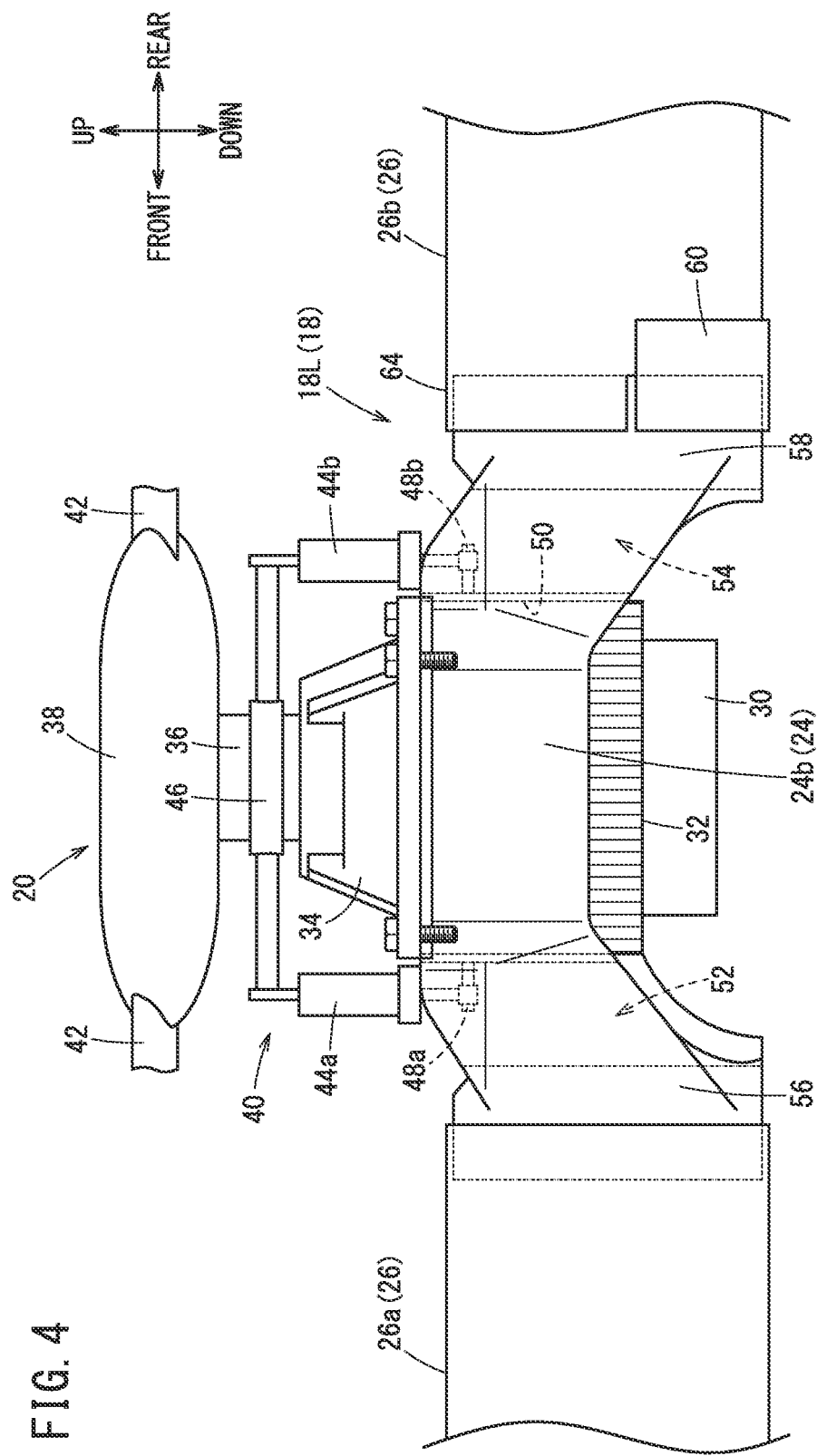
FIG. 4 is an enlarged view of a first mount, a VTOL rotor, and the peripheral structure thereof shown in FIG. 2.

FIG. 4 is an enlarged view of the first mount 24b, the VTOL rotor 20, and the peripheral structure thereof shown in FIG. 2. The first mount 24b supports the VTOL rotor 20. The VTOL rotor 20 includes a motor 30, a heat sink 32, a gear box 34, a shaft 36, a propeller 38, a variable pitch mechanism 40, a first actuator 44a, and a second actuator 44b. The heat sink 32 is attached to the outer periphery of the motor 30. The gear box 34 is attached to the upper end portion of the motor 30. The shaft 36 extends upward from the gear box 34. The propeller 38 is attached to the upper end portion of the shaft 36.

The variable pitch mechanism 40 adjusts the pitch of blades 42 of the propeller 38. The variable pitch mechanism 40 includes a moving member 46. The moving member 46 is movable up and down along the shaft 36. The moving member 46 is connected to a link mechanism (not shown). The link mechanism changes the pitch of each blade 42 according to the movement of the moving member 46. As shown in FIG. 4, the moving member 46 extends in the extension direction of the boom 18L with the shaft 36 as the center. The first actuator 44a is connected to the front end portion of the moving member 46. The second actuator 44b is connected to the rear end portion of the moving member 46.

An accommodation hole 50, a first void 52, and a second void 54 are formed in the first mount 24b. Further, a front joint portion 56 is formed at the front end portion of the first mount 24b, and a rear joint portion 58 is formed at the rear end portion of the first mount 24b. Each of the accommodation hole 50, the first void 52, and the second void 54 penetrates in the up-down direction.

The accommodation hole 50 is located substantially at the center of the first mount 24b in the front-rear direction. The VTOL rotor 20 is accommodated in the accommodation hole 50. The first void 52 is located between the accommodation hole 50 and the front joint portion 56. A first actuator supporting portion 48a for supporting the first actuator 44a is formed in the first void 52. The second void 54 is located between the accommodation hole 50 and the rear joint portion 58. A second actuator supporting portion 48b for supporting the second actuator 44b is formed in the second void 54.

The front joint portion 56 protrudes toward the front pipe 26a located on the front side. The front joint portion 56 extends in a direction rotated clockwise by a predetermined angle with respect to the front-rear direction. The front joint portion 56 is inserted into the rear end portion of the front pipe 26a. The front joint portion 56 and the rear end portion of the front pipe 26a are permanently connected.

The rear joint portion 58 protrudes toward the intermediate pipe 26b located on the rear side. The rear joint portion 58 extends in the front-rear direction. The rear joint portion 58 is connected to the front end portion of the intermediate pipe 26b and a reinforcing member 60. The upper portion of the rear joint portion 58 has a rounded shape (for example, an elliptical shape) when viewed from the rear. The lower portion of the rear joint portion 58 has a rectangular shape with rounded corners when viewed from the rear.

Figure 5:
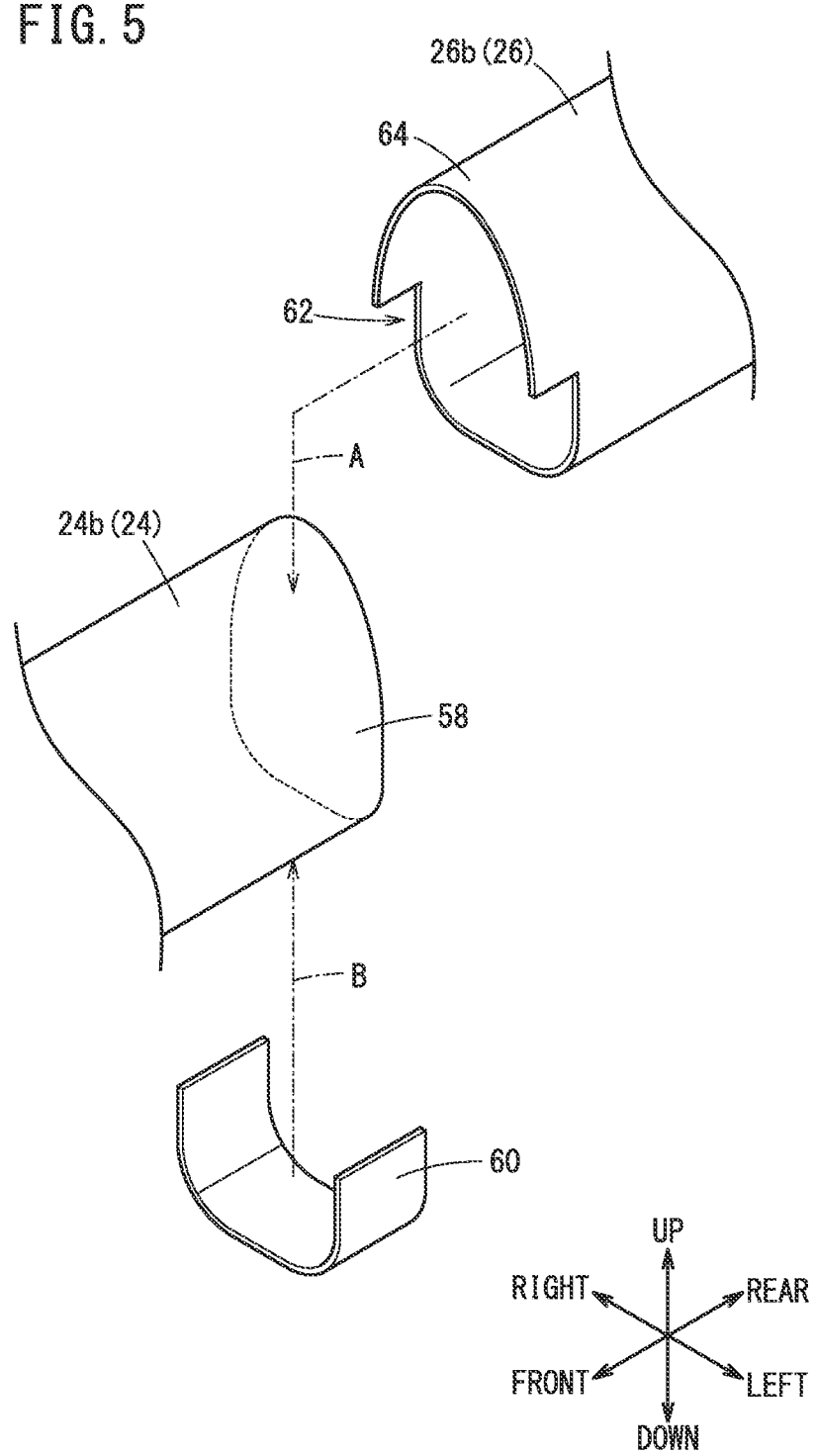
FIG. 5 is an exploded perspective view of a connection portion between the first mount and an intermediate pipe.

FIG. 5 is an exploded perspective view of a connection portion between the first mount 24b and the intermediate pipe 26b. The cross-sectional shape of the intermediate pipe 26b is the same as the cross-sectional shape of the rear joint portion 58. That is, the upper portion of the intermediate pipe 26b has a rounded shape (for example, an elliptical shape) when viewed from the front. The lower portion of the intermediate pipe 26b has a rectangular shape with rounded corners when viewed from the front. A notch 62 is formed in the lower portion of the front end portion of the intermediate pipe 26b. As a result, a protruding portion 64 is formed at the upper portion of the front end portion of the intermediate pipe 26b.

The protruding portion 64 protrudes toward the rear joint portion 58 of the first mount 24b. That is, the protruding portion 64 protrudes forward. The inner peripheral shape of the protruding portion 64 is the same as the outer peripheral shape of the upper portion of the rear joint portion 58. The maximum width (the width in the left-right direction) of the protruding portion 64 is equal to or less than the width (the width in the left-right direction) of the notch 62. The length (the length in the front-rear direction) of the protruding portion 64 is equal to or less than the length (the length in the protruding direction) of the rear joint portion 58.

As indicated by an arrow A in FIG. 5, the protruding portion 64 of the intermediate pipe 26b is overlapped with the rear joint portion 58 from above (a first direction). As a result, the protruding portion 64 comes into contact with the upper part of the outer peripheral surface of the rear joint portion 58. The protruding portion 64 and the rear joint portion 58 are fastened to each other by a plurality of fastening members such as bolts. In this manner, the protruding portion 64 is detachably connected to the rear joint portion 58. In a state in which the protruding portion 64 is connected to the rear joint portion 58, the lower portion of the rear joint portion 58 is disposed in the notch 62.

The reinforcing member 60 is a bent plate member. The cross-sectional shape of the reinforcing member 60 is the same as the cross-sectional shape of the lower portion of the rear joint portion 58 and the cross-sectional shape of the lower portion of the intermediate pipe 26b. However, the reinforcing member 60 is slightly larger than the lower portion of the rear joint portion 58 and the lower portion of the intermediate pipe 26b. In other words, the width (the width in the left-right direction) of the reinforcing member 60 is slightly larger than the width (the width in the left-right direction) of the rear joint portion 58 and the width (the width in the left-right direction) of the intermediate pipe 26b. The length (the length in the front-rear direction) of the reinforcing member 60 is, for example, about twice the length (the length in the protruding direction) of the protruding portion 64. However, the length of the reinforcing member 60 is not limited to this length. The reinforcing member 60 may have any length as long as it overlaps the lower portion of the intermediate pipe 26b and the lower portion of the rear joint portion 58 located in the notch 62 in a state where the rear joint portion 58 and the protruding portion 64 of the intermediate pipe 26b are fastened to each other.

As indicated by an arrow B in FIG. 5, the reinforcing member 60 is overlapped with the rear joint portion 58 and the intermediate pipe 26b from below (a second direction). As a result, the reinforcing member 60 comes into contact with the lower part of the outer peripheral surface of the rear joint portion 58 and the lower part of the outer peripheral surface of the intermediate pipe 26b. The reinforcing member 60 and the rear joint portion 58 are fastened to each other by a plurality of fastening members such as bolts. Further, the reinforcing member 60 and the intermediate pipe 26b are fastened to each other by a plurality of fastening members such as bolts. In this manner, the reinforcing member 60 is detachably connected to the rear joint portion 58 and the intermediate pipe 26b.

As described above, the front end portion of the intermediate pipe 26b and the rear joint portion 58 of the first mount 24b are connected to each other. The structure of the rear end portion of the intermediate pipe 26b is identical to the structure of the front end portion of the intermediate pipe 26b except that the front and rear sides are reversed. In addition, the structure of the second mount 24c is identical to the structure of the first mount 24b except that the front and rear sides are reversed. Accordingly, the rear end portion of the intermediate pipe 26b and the front joint portion (not shown) of the second mount 24c are connected in the same manner as the front end portion of the intermediate pipe 26b and the rear joint portion 58 of the first mount 24b.

4. Assembly and Maintenance of Boom 18L

The assembly process of the boom 18L is performed, for example, in the following procedure. First, the front pipe 26a to which the front mount 24a and the first mount 24b are connected is connected to the front wing 14. Further, the rear pipe 26c to which the second mount 24c and the rear mount 24d are connected is connected to the rear wing 16. In this manner, the front pipe 26a and the rear pipe 26c are connected to the fuselage in advance. Therefore, each of the first mount 24b and the second mount 24c is positioned.

In this state, the protruding portion 64 of the front end portion of the intermediate pipe 26b is overlapped with the rear joint portion 58 of the first mount 24b from above. The intermediate pipe 26b and the first mount 24b are fastened to each other by a plurality of fastening members. Next, the reinforcing member 60 is overlapped with the rear joint portion 58 of the first mount 24b and the intermediate pipe 26b from below. The reinforcing member 60 and the first mount 24b are fastened to each other by a plurality of fastening members. Further, the reinforcing member 60 and the intermediate pipe 26b are fastened to each other by a plurality of fastening members. Thus, the intermediate pipe 26b is connected to the first mount 24b. Similarly, the intermediate pipe 26b is also connected to the second mount 24c. As a result, the basic part of the boom 18L is completed.

In the maintenance of the boom 18L, the boom 18L is disassembled. The process of disassembling the boom 18L is performed in the reverse order of the process of assembling the boom 18L.

5. Other Embodiments

The protruding portion 64 of the intermediate pipe 26b may be overlapped with the rear joint portion 58 from a direction other than above (for example, from the left direction). Accordingly, the reinforcing member 60 may be overlapped with the rear joint portion 58 and the intermediate pipe 26b from a direction other than below (for example, from the right direction). However, for the following reason, it is preferable that the protruding portion 64 of the intermediate pipe 26b is overlapped with the rear joint portion 58 from above. That is, in the attaching and detaching process of the reinforcing member 60, the intermediate pipe 26b is supported by the first mount 24b and the second mount 24c. Therefore, according to the above-described configuration, a device for supporting the intermediate pipe 26b is not required in the attaching and detaching process of the reinforcing member 60.

The number of the mounts 24 may not be four. Further, the number of the connecting pipes 26 may not be three. For example, the number of the mounts 24 may be five, and the number of the connecting pipes 26 may be four. Further, the shape of the boom 18 may not be a shape extending from the front end portion to the rear end portion. For example, the shape of the boom 18 may be annular. In any embodiment, the connecting pipe 26 that is not fixed to the fuselage may be attachable to and detachable from the mount 24.

6. Effect of Present Embodiment

In order to connect the first mount 24b and the second mount 24c with an ordinary pipe, it is necessary to push open the first mount 24*b* and the second mount 24*c* to insert the pipe therein. However, the first mount 24*b* and the second mount 24*c* are fixed to the fuselage. For this reason, it is not possible to push open the first mount 24*b* and the second mount 24*c*.

In the present embodiment, the intermediate pipe 26*b* is overlapped with the first mount 24*b* from above, and the reinforcing member 60 is overlapped with the first mount 24*b* and the intermediate pipe 26*b* from below, whereby the intermediate pipe 26*b* and the first mount 24*b* are connected to each other. The intermediate pipe 26*b* and the second mount 24*c* are connected to each other in the same manner. Further, the intermediate pipe 26*b* is attachable to and detachable from the first mount 24*b* and the second mount 24*c*. One reinforcing member 60 is attachable to and detachable from the first mount 24*b* and the intermediate pipe 26*b*. Another reinforcing member 60 is attachable to and detachable from the second mount 24*c* and the intermediate pipe 26*b*. In the present embodiment, it is not necessary to push open the first mount 24*b* and the second mount 24*c*. Therefore, according to the present embodiment, the rotor support structure is easy to assemble and disassemble, and easy to maintain.

Note that there is a model in which the first mount 24*b* and the second mount 24*c* can be pushed open. In the case of such a model, the first mount 24*b* and the intermediate pipe 26*b* may be connected to each other in the following procedure, for example.

The intermediate pipe 26*b* is disposed in a direction in which the rear joint portion 58 of the first mount 24*b* extends when viewed from above. Further, the intermediate pipe 26*b* is disposed such that the notch 62 of the front end portion thereof and the upper portion of the first mount 24*b* overlap each other when viewed from the left side. From this state, the intermediate pipe 26*b* is moved toward the first mount 24*b*. Then, the notch 62 of the front end portion of the intermediate pipe 26*b* comes into contact with the upper portion of the first mount 24*b*. The intermediate pipe 26*b* is then moved downward. As a result, the protruding portion 64 of the front end portion of the intermediate pipe 26*b* is overlapped with the rear joint portion 58 of the first mount 24*b* from above. The subsequent procedure is the same as that described above. By the above-described procedure, the positioning of the intermediate pipe 26*b* with respect to the first mount 24*b* is facilitated.

7. Inventions Obtained from Embodiments

The inventions that can be grasped from the above embodiments will be described below.

According to an aspect of the first invention, provided is the rotor support device (18, 18L, 18R) that is provided in the aircraft (10) and supports the rotor (20) configured to generate thrust in the vertical direction, the rotor support device including: the mount (24, 24*b*, 24*c*) configured to support the rotor and including the joint portion (56, 58) protruding outward; the connecting member (26, 26*b*) extending in the protruding direction of the joint portion and detachably connected to the joint portion; and the reinforcing member (60) detachably connected to the joint portion and the connecting member in order to reinforce the connection between the joint portion and the connecting member, wherein the connecting member includes the end portion connected to the joint portion, and the end portion includes the notch (62) and the protruding portion (64) that is formed by forming the notch, the protruding portion is overlapped with a part of the outer peripheral surface of the joint portion, the part being located on the side of the first direction perpendicular to the protruding direction of the joint portion, and is detachably connected to the joint portion, and the reinforcing member is overlapped with the connecting member and another part of the outer peripheral surface of the joint portion, the another part being located on the side of the second direction opposite to the first direction, and is detachably connected to the joint portion and the connecting member.

According to the above configuration, the rotor support structure is easy to assemble and disassemble, and easy to maintain.

In the above aspect, the protruding portion may be overlapped with an upper part of the outer peripheral surface of the joint portion and detachably connected to the joint portion, and the reinforcing member may be overlapped with the connecting member and a lower part of the outer peripheral surface of the joint portion and detachably connected to the joint portion and the connecting member.

According to the above configuration, a device for supporting the connecting member is not required in the attaching and detaching process of the reinforcing member.

In the above aspect, the connecting member may be a pipe.

In the above aspect, the rotor support device may further include the first mount (24*b*) and the second mount (24*c*) as the mount, and the first reinforcing member and the second reinforcing member as the reinforcing member, the first mount may support the first rotor as the rotor, the second mount may support the second rotor as the rotor, the notch and the protruding portion may be formed at each of the first end portion and the second end portion of the connecting member, the first end portion of the connecting member and the first reinforcing member may be fastened to the joint portion of the first mount, and the second end portion of the connecting member and the second reinforcing member may be fastened to the joint portion of the second mount.

In the above aspect, the rotor support device may further include the second connecting member (26*a*, 26*c*) permanently coupled to the mount and connected to the wing (14, 16) of the aircraft.

In the above aspect, the rotor support device may further include the fixed mount (24*a*, 24*d*) configured to support a rotor different from the rotor and permanently coupled to the second connecting member.

In the above aspect, the mount may include the void (52, 54) penetrating in the up-down direction.

In the above aspect, the rotor support device may further include the actuator (44*a*, 44*b*) configured to change the pitch of each blade (42) of the rotor, and the actuator supporting portion (48*a*, 48*b*) configured to support the actuator and disposed inside the void.

According to an aspect of the second invention, provided is the rotor support device (18, 18L, 18R) that is provided in the aircraft (10) and supports the rotor (20) configured to generate thrust in the vertical direction, the rotor support device including: the mount (24, 24*b*, 24*c*) configured to support the rotor and including the joint portion (56, 58) protruding outward; the connecting member (26, 26*b*) extending in the protruding direction of the joint portion and detachably connected to the joint portion; and the reinforcing member (60) detachably connected to the joint portion and the connecting member in order to reinforce the connection between the joint portion and the connecting member, wherein the connecting member includes the end portion connected to the joint portion, and the end portion includes the notch (62) and the protruding portion (64) that is formed by forming the notch, the protruding portion is overlapped with the joint portion from the first direction perpendicular to the protruding direction of the joint portion, and is detachably connected to the joint portion, and the reinforcing member is overlapped with the joint portion and the connecting member from the second direction that is opposite to the first direction, and is detachably connected to the joint portion and the connecting member.

Note that the present invention is not limited to the above disclosure, and various modifications are possible without departing from the essence and gist of the present invention.

The invention claimed is:

1. A rotor support device that is provided in an aircraft and supports a rotor configured to generate thrust in a vertical direction, the rotor support device comprising:
   a mount configured to support the rotor and including a joint portion protruding outward;
   a connecting member extending in a protruding direction of the joint portion and detachably connected to the joint portion; and
   a reinforcing member detachably connected to the joint portion and the connecting member in order to reinforce connection between the joint portion and the connecting member,
   wherein the connecting member includes an end portion connected to the joint portion, and the end portion includes a notch and a protruding portion that is formed by forming the notch,
   the protruding portion is overlapped with a part of an outer peripheral surface of the joint portion, the part being located on a side of a first direction perpendicular to the protruding direction of the joint portion, and is detachably connected to the joint portion, and
   the reinforcing member is overlapped with the connecting member and another part of the outer peripheral surface of the joint portion, the another part being located on a side of a second direction opposite to the first direction, and is detachably connected to the joint portion and the connecting member.

2. The rotor support device according to claim 1, wherein the protruding portion is overlapped with an upper part of the outer peripheral surface of the joint portion, and is detachably connected to the joint portion, and
   the reinforcing member is overlapped with the connecting member and a lower part of the outer peripheral surface of the joint portion, and is detachably connected to the joint portion and the connecting member.

3. The rotor support device according to claim 1, wherein the connecting member is a pipe.

4. The rotor support device according to claim 3, further comprising:
   a first mount and a second mount as the mount; and
   a first reinforcing member and a second reinforcing member as the reinforcing member,
   wherein the first mount supports a first rotor as the rotor, the second mount supports a second rotor as the rotor,
   the notch and the protruding portion are formed at each of a first end portion and a second end portion of the connecting member,
   the first end portion of the connecting member and the first reinforcing member are fastened to the joint portion of the first mount, and
   the second end portion of the connecting member and the second reinforcing member are fastened to the joint portion of the second mount.

5. The rotor support device according to claim 1, further comprising a second connecting member permanently coupled to the mount and connected to a wing of the aircraft.

6. The rotor support device according to claim 5, further comprising a fixed mount configured to support a rotor different from the rotor and permanently coupled to the second connecting member.

7. The rotor support device according to claim 1, wherein the mount includes a void penetrating in an up-down direction.

8. The rotor support device according to claim 7, further comprising:
   an actuator configured to change a pitch of each blade of the rotor; and
   an actuator supporting portion configured to support the actuator and disposed inside the void.

9. A rotor support device that is provided in an aircraft and supports a rotor configured to generate thrust in a vertical direction, the rotor support device comprising:
   a mount configured to support the rotor and including a joint portion protruding outward;
   a connecting member extending in a protruding direction of the joint portion and detachably connected to the joint portion; and
   a reinforcing member detachably connected to the joint portion and the connecting member in order to reinforce connection between the joint portion and the connecting member,
   wherein the connecting member includes an end portion connected to the joint portion, and the end portion includes a notch and a protruding portion that is formed by forming the notch,
   the protruding portion is overlapped with the joint portion from a first direction perpendicular to the protruding direction of the joint portion, and is detachably connected to the joint portion, and
   the reinforcing member is overlapped with the joint portion and the connecting member from a second direction that is opposite to the first direction, and is detachably connected to the joint portion and the connecting member.

* * * * *